Patented Mar. 15, 1927.

1,621,438

UNITED STATES PATENT OFFICE.

FEDERICO SCHWARTZ, OF BARCELONA, SPAIN, ASSIGNOR OF ONE-HALF TO ENRIQUE GIL-CAMPORRO, OF BARCELONA, SPAIN.

PROCESS FOR PREPARING A VARNISH.

No Drawing. Application filed March 19, 1925, Serial No. 16,817, and in Spain March 26, 1924.

My invention relates to a process for obtaining a varnish from fatty acids and resins or gums, which possesses the property of being soluble in water and which on drying forms upon the object to which it is applied a brilliant coating, insoluble in water, very durable, hard and elastic.

The process consists essentially in firstly saponifying with ammonia the fatty acids of castor oil, forming "castor-oil" ammoniate, for which operation the castor oil is saponified with caustic soda so as to obtain a solid soap of "castor-oil" soda, which afterwards is decomposed with hydro-chloric acid so as to separate the fatty acids of the castor oil and, lastly, these fatty acids are treated with an aqueous ammonia solution so as to form the "castor-oil" ammoniate.

It is quite true that the expression "castor-oil" ammoniate used in this specification is not a scientifically correct expression, but it has been employed as the simplest means of indicating the combination of ammonia with the fatty acids contained in castor-oil. Castor-oil contains, as is well known, various fats and fatty acids, and the proportions of these fats and fatty acids differ according to the origin of the castor-oil. On treating castor-oil with caustic soda the glycerine is separated and a soap is formed which is in reality a mixture of the soda soaps formed from the different fatty acids contained in the castor-oil. By diluting this soap with water and adding to it hydro-chloric acid as is explained in the specification, this soap, or rather mixture of soaps, becomes again decomposed and a mixture of the different fatty acids contained in the castor-oil is obtained and, finally, on treating this mixture of fatty acids with ammonia, a mixture of the ammoniacal soaps of the fatty acids contained in the oil is formed. It is to this mixture that, in order to simplify its description in the specification, the term "castor-oil" ammoniate has been applied.

As soon as this product is obtained the saponification of the gums and resins by means of ammonia is proceeded with, in the presence of a certain proportion of "castor-oil" ammoniate which acts as a catalytic and thus facilitates the saponification of the gums and resins, which otherwise would become highly difficult or impossible and, lastly, the saponified resin is mixed in suitable proportions with more "castor-oil" ammoniate or with some other saponified oil and with an aqueous solution of albumin, casein, ceratine or other similar substance.

The solution of albumin, casein or other similar substance greatly improves the qualities of this varnish, and gives to the coating of varnish which remains on the body to which it is applied, important qualities of adherence, delicacy to touch, hardness and durability in the presence of mechanical action and that of heat and, lastly, it communicates the property of increasing its melting point to such an extent that upon resting the hand upon the varnish it does not soften and thus does not adhere to the hand.

In practice, in order to manufacture this varnish industrially, a commencement is made by preparing the "castor-oil" ammoniate, for which purpose first pressure castor-oil is used mixing it with 40% caustic soda and with water the mixture being vigorously shaken in a mixer and heated by steam until the product turns transparent after which it is allowed to settle and cool down. The mass is then separated into two parts, an aqueous alkaline solution containing the glyceric compounds and a solid soap of castor-oil and soda. As soon as this soap is removed it is diluted with water and to it is added a suitable proportion of hydro-chloric acid dissolved in water until an acid reaction is obtained, on which the fatty acids of the castor-oil and an aqueous acid solution of chloride of soda are formed. After a few hours the product is decanted and thus the fatty acids of the castor-oil are obtained and these are afterwards treated with an aqueous solution of ammonia until the "castor-oil" ammoniate is formed.

Afterwards the saponification of the gums or resins by means of ammonia is proceeded with, which operation is performed in the presence of "castor-oil" ammoniate which acts as a catalytic and facilitates the reaction.

This operation is effected in a mixer heated to the temperature of an indirect hot-water bath in which are introduced the finely crushed gums and resins, the ammonia necessary and the corresponding proportion of "castor-oil" ammoniate and the mixture is heated up to 80° C., being continually kept in motion.

Having thus obtained the soap of the gum or resin which may be selected, the varnish is prepared by mixing in suitable proportions this soap of gum or resin with an oil saponified with ammonia, for example, this same "castor-oil" ammoniate, and a certain proportion of albumin, casein, ceratine or other similar substance dissolved in water. After suitably shaking this mixture the varnish becomes prepared and is ready for use.

The varnish thus obtained is perfectly soluble in water so that it can be diluted with great ease and upon applying it to a surface, when the varnish dries and the ammonia evaporates, a coating remains which is made up of a mixture of resins or gums, fatty acids and albumin or other added substance, which possesses unsurpassable qualities as a varnish.

I claim:—

1. A process for the manufacture of a varnish, which consists in preparing "castor-oil" ammoniate, saponifying gums or resins in the presence of this "castor-oil" ammoniate, saponifying separately an oil with ammonia and afterwards mixing in suitable proportions the saponified gums or resins with the saponified oil.

2. A process for the manufacture of a varnish which comprises saponifying gums or resins in the presence of "castor-oil" ammoniate which acts as a catalytic, saponifying separately an oil with ammonia and mixing both soaps in suitable proportions.

3. A process for manufacturing a varnish which comprises the preparation of "castor-oil" ammoniate, the saponification of gums or resins in the presence of this "castor-oil" ammoniate, the separate saponification of an oil with ammonia and the mixture of the saponified gums or resins with the saponified oil and with a solution of albumin, casein or other similar substance.

4. A process for the manufacture of a varnish, which comprises the treatment of "castor-oil" with caustic soda in order to form a soap of "castor-oil" and soda, the decomposition of this soap by hydrochloric acid in order to separate the fatty acids of the castor-oil, the treatment of these fatty acids with ammonia in order to saponify them and thus obtain "castor-oil" ammoniate, the saponification of gums or resins in the presence of a quantity of this "castor-oil" ammoniate, which acts as a catalytic, the separate saponification of an oil with ammonia, the mixing of these saponified gums or resins with the saponified oil and the adding to it of a solution of albumin, casein or other similar substance.

In testimony whereof I have signed my name to this specification.

FEDERICO SCHWARTZ.